United States Patent
Ryuhgoh et al.

[11] Patent Number: 5,432,224
[45] Date of Patent: Jul. 11, 1995

[54] MOLDABLE COMPOSITION, PROCESS FOR PRODUCING SINTERED BODY THEREFROM AND PRODUCTS FROM SAME

[75] Inventors: Jiroh Ryuhgoh, Shiga; Kohshi Kawamoto, Kusatsu; Tadahiro Osanaga, Kyoto; Yoshiroh Nakata, Ibaraki, all of Japan

[73] Assignee: Sanyo Chemical Industries, Ltd., Kyoto, Japan

[21] Appl. No.: 733,979

[22] Filed: Jul. 22, 1991

Related U.S. Application Data

[63] Continuation of Ser. No. 310,624, Feb. 15, 1989, abandoned.

[30] Foreign Application Priority Data

| Feb. 18, 1988 | [JP] | Japan | 63-36380 |
| Apr. 30, 1988 | [JP] | Japan | 63-108506 |
| Jul. 6, 1988 | [JP] | Japan | 63-167988 |
| Nov. 24, 1988 | [JP] | Japan | 63-297011 |

[51] Int. Cl.⁶ ............... C08L 59/00; C08L 71/12; C08L 81/06; C04B 35/00
[52] U.S. Cl. ............ 524/439; 524/430; 524/434; 524/436; 524/440; 524/441; 524/428; 524/420; 524/437; 524/442; 524/413; 524/433; 524/444; 501/94
[58] Field of Search ............ 524/251, 254, 424, 427, 524/430, 440, 439

[56] References Cited

U.S. PATENT DOCUMENTS

| 2,386,544 | 10/1945 | Crowley | 75/22 |
| 2,434,271 | 1/1946 | Howatt | 25/156 |
| 2,446,872 | 8/1948 | Ehlers | 25/156 |
| 3,125,618 | 3/1964 | Levinson | 264/63 |
| 3,285,873 | 11/1966 | Bailey | 260/30.6 |
| 3,929,476 | 12/1975 | Kirby, Jr. et al. | 75/214 |
| 4,071,594 | 1/1978 | Pearson et al. | 264/67 |
| 4,503,168 | 3/1985 | Hartsing, Jr. | 524/427 |
| 4,517,319 | 5/1985 | Reske et al. | 524/413 |
| 4,551,496 | 11/1985 | Renlund et al. | 524/322 |
| 4,595,558 | 6/1986 | Baldwin et al. | 419/66 |
| 4,598,110 | 7/1986 | Koyama | 524/430 |
| 4,624,812 | 11/1986 | Farrow et al. | 264/63 |
| 4,638,029 | 1/1987 | Meschke et al. | 524/430 |
| 4,680,140 | 7/1987 | Kageyama | 252/512 |
| 4,772,653 | 9/1988 | McKenna | 524/427 |
| 4,891,399 | 1/1990 | Ohkawa et al. | 524/440 |

FOREIGN PATENT DOCUMENTS 0300039  1/1989  European Pat. Off.

OTHER PUBLICATIONS

S Budavari ed, Merck Index, 11th ed, p. 1204.

*Primary Examiner*—Edward J. Webman
*Attorney, Agent, or Firm*—Oblon, Spivak, McClelland, Maier & Neustadt

[57] ABSTRACT

Moldable compositions comprising metallic powder or combination thereof with ceramic powder, mixed an organic binder are disclosed, at least a part of which comprises a synthetic resin component (A) having a heat deformation temperature of 130° C. or higher. The component A may be used in combination with another component (B) having a melting point of 30° C.–100° C., with or without another thermoplastic component (C), having a heat deformation temperature of 13° C. or less. Moldable compositions, comprising metallic and/or ceramic powder mixed with an organic binder comprising a secondary or tertiary amine (D), or combination thereof with a thermoplastic resin (E), are also disclosed.

11 Claims, 1 Drawing Sheet

5,432,224

MOLDABLE COMPOSITION, PROCESS FOR PRODUCING SINTERED BODY THEREFROM AND PRODUCTS FROM SAME

This application is a Continuation of application Ser. No. 07/310,624, filed on Feb. 15, 1989, now abandoned.

BACKGROUND OF THE INVENTION

1. Field of the Invention

This invention relates to moldable metallic and/or ceramic composition, to process for producing a sintered body therefrom and to products resulting from same.

2. Description of the Prior Art

It is known to produce sintered bodies from metallic or ceramic powder mixed with thermoplastic binders (such as polypropylene, methacrylate copolymer, polystyrene, ethylene-vinyl acetate copolymer, low density polyethylene, and combinations of them), or combinations thereof with plasticizer or lubricants (such as paraffin wax, diethyl phthalate, and stearic acid). It is also known to produce sintered bodies by injection molding such compositions and then removing or driving off the binder (hereinafter referred to as debinding) from the molded articles, followed by sintering the articles (U.S. Pat. No. 2,593,943).

As there is a tendency of deformation of molded bodies by gravity, or cracking or blistering with decomposed gas, during debinding of molded articles produced from these known molding compositions; molded bodies are buried in ceramic or metallic powder to prevent deformation, or heated up slowly such as at a rate of 1–10° C./hour to depress generation of decomposed gas, and therefore it is necessary to brush off the powder from the surface of the debinded bodies prior to sintering, or it takes long time to drive off the binder. Thus, these known molding compositions are not satisfied for industrial production.

SUMMARY OF THE INVENTION

It is an object of the present invention to provide a moldable metallic and/or ceramic composition, having little or reduced tendency of deformation during debinding.

It is another object of the present invention to provide a moldable metallic or ceramic composition, which can be debinded within a short period of time without blistering.

It is still another object of the present invention to provide a moldable metallic or ceramic composition, capable of providing economically sintered bodies free from defects, such as deformation or blistering.

It is yet another object of the present invention to provide a process for producing economically sintered bodies, within a short period of time without blistering.

Briefly, these and other objects of the present invention as hereinafter will become more readily apparent have been attained broadly by a moldable composition, which comprises a metallic powder or a mixed powder of metallic and ceramic powder, mixed with an organic binder comprising at least one synthetic resin component (A) having a heat deformation temperature of 130° C. or higher, with or without at least one other component (B) having a melting point of 30° C.–100° C., or combination thereof with other thermoplastic component (C), having a heat deformation temperature of 130° C. or less; or by a moldable composition, which comprises a sinterable particulate material, mixed with an organic binder comprising at least one secondary or tertiary amine (D), or combination thereof with at least one thermoplastic resin (E).

DETAILED DESCRIPTION OF THE PREFERRED EMBODIMENTS

[Component A]

Figure 1:
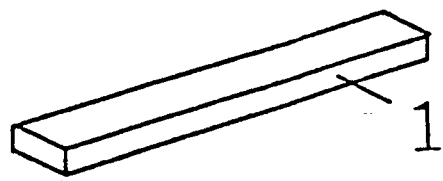
FIG. 1 is a perspective view of a specimen.

Said synthetic resin component (A) has a heat deformation temperature of usually 130° C. or higher, preferably 150° C. or higher, as measured acording to ASTM D648 using a load of 4.6 Kg/cm$^2$.

Suitable synthetic resins include thermoplastic resins, for example, polyacetals, including homopolymers of trioxane, and copolymers of trioxane with ethylene oxide, dioxorane, substituted dioxorane, 1,4-dioxane or the like; polyaryl ethers, such as polyphenylene oxides, polyphenylene sulfides; polyamides, such as nylons 6, 11, 12 and 66, and copolymers of them; polycarbonates; polyesters, such as polyethylene terephthalates and polybutylene terephthalates; polysulfones, such as polyaryl sulfones, polyether sulfones; polyether ketones, polyvinylidene fluorides, and the like, as well as mixtures of two or more of them. Among these, preferred are polyacetals, polyphenylene oxides, polysulfones, polycarbonates, polyesters and polyamides. Particularly preferred are polyacetals, in view of their low melt viscosity and facilities for molding and thermal decomposition.

As at least a part (preferably 10–40%)of said component (A), there may be used one or more crosslinked thermoplastic resins and/or thermosetting resins.

Suitable examples of crosslinked thermoplastic resins include resins of addition polymerization type [for example, those mentioned below as examples of thermoplastic resins (E), such as acrylic resins, olefinic resins, styrene copolymers and other vinyl polymers], copolymerized with one or more crosslinking monomers. Suitable crosslinking monomers include, for example, bis(-meth)acrylamides (bisacrylamides and bismethacrylamides; similar expressions are used hereinafter), such as N,N'-methylenebis(meth)acrylamides; polyvinyl compounds, such as divinylbenzene, divinyltoluens, divinylether, divinylketone, trivinylbenzenes and the like; polyesters of unsaturated mono- or poly-carboxylic acids with polyols, such as ethylene glycol di(meth)acrylates, trimethylolpropane Di(meth)acrylates, glycerin tri(meth)-acrylates; and poly(meth)allyl ethers of polyols, such as di(meth)allyl ethers of alkylene glycols (such as ethylene glycol). Among these, preferred are bis(meth)acrylamides, polyvinyl compounds, and polyesters of unsaturated mono- or polycarboxylic acids with polyols. Particularly preferred re N,N'-methylene bis-(meth)acrylamides, divinylbenzenes, thylene glycol di(meth)acrylates, and trimethylolpropane Di(meth)acrylates. Illustrative examples of such resins are cross-liked polystyrenes, and crosslinked styrene(meth)acrylate copolymers.

Other examples of crosslinked thermoplastic resins include polycondensation type resins [for example, polyesters (such as polyethylene terephthalates), polyamides (such as Nylon 66), polyimides, polysulfones, poly-paraphenylenes], crosslinked with one or more crosslinkers. Suitable examples of such crosslinkers include compounds having three or more reactive groups causing polycondensation, for instance, polycarboxylic acids, such for instance, polycarboxylic acids, such as aromatic and aliphatic polycarboxylic acids (benzene tricarboxylic acids and the like); polyamines, such as aromatic and aliphatic polyamines (polyalkylene polyamines, such as diethylene triamine and the like); polyols, such as polyhydric alcohols (glycerin, trimethylol propane and the like) and alkylene oxide (such as ethylene oxide and/or propylene oxide) adducts of these compounds containing 3 or more active hydrogen atoms.

Suitable thermosetting resins include, for example, phenolic resins, urea resins, cured epoxy resins, and polyurethane resins.

Semi-synthetic resins, such as nitrocellulose and cellulose acetates may also be used.

These resins are usually used in the form of powder. Such resin powder may be those produced in powder form, or those powdered after production of resins.

Particle size of these resins is not particularly restricted, and can vary according to particle size of particulate material (metallic and/or ceramic powder). Preferably, these resins have an average diameter smaller than that of the particulate material, particularly smaller than a half of the latter.

[Component B]

Said component A is used preferably in combination with at least one other component (B) having a melting point of 30° C.–100° C., preferably 50°–100° C.

Suitable examples of said component B are polyethers, such as those represented by the formula:

  (1)

wherein R is a residue of active hydrogen atom-containing compound; R' is H, a mono-valent hydrocarbon radical or acyl radical; A is an alkylene radical containing 1–4 carbon atoms, or an alkylene radical containing 2–4 carbon atoms, having an aryl-substituent; m is an integer of 1–8 (preferably 1–3); and n is an integer of at least 2 (preferably at least 4).

Examples of active hydrogen atom-containing compounds, constituting the residue R, are water; alcohols, for instance, low molecular weight polyols (such as ethylene glycol, propylene glycols, 1,3- and 1,4-butane diols, 1,6-hexane diol, neopentyl glycol, cyclohexylene glycol, glycerin, trimethylol propane, pentaerythritol, sorbitol, sucrose and the like), and monohydric alcohols (such as aliphatic alcohols containing 1–20 carbon atoms and aromatic alcohols); phenols, for example, polyhydric phenols (bisphenols, such as bisphenol A), and mono-hydric phenols [phenol, naphthols, alkyl($C_1$–$C_{12}$)- or aryl-substituted phenols, such as octylphenol, nonylphenol, dodecylphenol and phenylphenols]; amines, for example, alkanol amines (such as mono-, di- and tri-ethanol amines and propanol amines), aliphatic or aromatic polyamines (such as ethylene diamine and diethylene triamine), aliphatic or aromatic monoamines [mono- and di- alkyl($C_1$–$C_{20}$) amine, aniline and the like]; and mixtures of two or more of them. Among these, preferred are water and low molecular weight polyols, particularly ethylene glycol and propylene glycols.

Suitable mono-valent hydrocarbon radicals in R' include, for example, alkyl radicals containing 1–20 carbon atoms, such as methyl, ethyl, propyl, butyl, hexyl, octyl and decyl radicals; aromatic hydrocarbon radicals, including aryl radicals (such as phenyl and naphthyl), aralkyl radicals (such as benzyl and phenethyl), and alkylaryl (octylphenyl and nonylphenyl). Examples of suitable acyl radicals in R' are those of carboxylic acids containing 2–20 carbon atoms, such as acetyl. Among R', preferred are H and $C_1$–$C_4$ alkyl, particularly H, methyl and ethyl.

Examples of said alkylene radicals A include alkylene radicals, such as methylene, ethylene, propylene, butylene, and phenyl-ethylene groups. Among these, preferred are ethylene, propylene, butylene and combinations of ethylene with propylene. Particularly preferred is ethylene.

Molecular weight of polyethers can vary widely, but preferably up to about 20,000.

Illusutrative examples of suitable polyethers are polyalkylene glycols, including those having a molecular weight of usually about 150– about 20,000, preferably 1000–10,000, and containing 2–4 carbon atoms in each alkylene group, such as polyethylene glycols (MW 150–20,000), polypropylene glycols (MW 200–5,000), polytetramethylene glycols (MW 200–3,000), copolymers of ethylene oxide and propylene oxide (MW 200–20,000).

Other examples of said component B are waxes, such as petroleum wax, natural waxes (such as bees wax), and synthetic waxes (such as polyethylene wax); low molecular weight solid materials, such as fatty acids ($C_{10}$–$C_{20}$ or more, such as stearic acid), salts thereof (soaps and metal soaps such as aluminum stearate), fatty alcohols ($C_{12}$–$C_{20}$ or more, such as stearic alcohol), fatty amines ($C_{12}$–$C_{20}$ or more, such as mono- and di-stearyl amines), and various surfactants (such as those written in U.S. Pat. No. 4,331,447); and mixtures of two or more of them.

Among these, preferred are polyethers, particularly polyalkylene glycols, especially polyethylene glycols, in view of compatibility, when used in conjunction with a polyacetal as the component A.

[Component C]

The binder may contain, other thermoplastic component (C), having a heat deformation temperature of 130° C. or less and a melting point of more than 100° C., to improve moldability. Suitable components C include, for example, polyethers [those represented by the formula (1) but having higher molecular weight, such as polyethylene oxides]; and polymers of ethylenically unsaturated monomers, including polyolefins (such as polyethylenes, polypropylenes, poly-4-methylpentene-1, polystyrenes, polyalpha-methyl-styrenes, ethylene-vinyl acetate copolymers), and (meth)acrylic polymers [such as poly(meth)acrlates], and two or more of them. Molecular weight of these polymers may vary widely; but preferred are those having a molecular weight of about 1000–about 10 millions, more preferably about 5000–about 5 millions. These polymers have thermal decomposition temperature of usually 150°–600° C., preferably 200°–400° C.

Among these, preferred are polyethylene oxides, particularly those having a molecular weight of about 50,000–about 5 millions, with respect to compatibility.

[Component D]

In another embodiment of the present invention, the moldable composition comprises a metallic powder, a ceramic powder or a mixed powder of metallic and ceramic powder, mixed with an organic binder comprising at least one amine (D), selected from the group consisting of secondary amines and tertiary amines.

Suitable examples of said amine (D) are monoamines and polyamines (including ones containing a primary amino group in addition to the secondary and/or tertiary amino group), having an amine value of usually 50-500, preferably 40-400 and a molecular weight of usually at most 3000, preferably 100-1000.

Preferable amines include those represented by the formula:

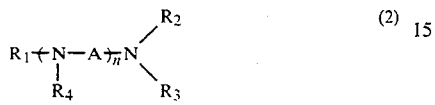

In the formula (2), $R_1$ is a monovalent hydrocarbon radical containing 5-30 carbon atoms, $R_2$ is hydrogen atom or a monovalent hydrocarbon radical containing 1-30 carbon atoms, $R_3$ is hydrogen atom or a monovalent hydrocarbon radical containing 1-30 carbon atoms, $R_4$ is hydrogen atom or a monovalent hydrocarbon radical containing 1-5 carbon atoms, A is an alkylene group containing 2-4 carbon atoms, which may have an aryl side group, and n is an integer of 0-5.

Examples of said hydrocarbon radical $R_1$, include aliphatic hydrocarbon radicals, for example, alkyl groups (such as pentyl, 2-ethylhexyl, octyl, dodecyl, hexadecyl, octadecyl, eicosyl and docosyl groups), alkenyl groups (such as myristoleyl, palmitoleyl, oleyl and rinoleyl groups); cycloaliphatic hydrocarbon radicals, for instance, cycloalkyl groups (such as cyclohexyl group); and aromatic hydrocarbon radicals, for example, aryl groups (phenyl and naphthyl groups), aralkyl groups (such as phenethyl, phenyloctyl and phenyldodecyl groups), alkylaryl groups (such as methylphenyl, octylphenyl and dodecylphenyl). Among these, preferred are aliphatic hydrocarbon radicals, particularly those containing 10-30 carbon atoms. Suitable hydrocarbon radicals in $R_2$ and $R_3$ include the above-mentioned monovalent hydrocarbon radicals containing 5-30 carbon atoms, and lower aliphatic hydrocarbon radicals, for example, lower alkyl groups (such as methyl, ethyl, n- and i-propyl and butyl groups) and lower alkenyl groups (such as allyl and butenyl groups). Preferred as $R_2$ are aliphatic hydrocarbon radicals (particularly those containing 1-20 carbon atoms); and preferred as $R_3$ are aliphatic hydrocarbon radicals (particularly those containing 1-20 carbon atoms) and hydrogen atom. Suitable monovalent hydrocarbon radicals in $R_4$ are those as mentioned above, containing 1-5 carbon atoms. Plural $R_4$s (in case where n is 2 or more) may be the same or different. Preferred as $R_4$ are methyl and ethyl groups (particularly ethyl group) and hydrogen atom. Suitable examples of said alkylene groups A are inclusive of alkylene proups containing 2-4 carbon atoms, such as ethylene, propylene and butylene groups; and aryl-substituted alkylene groups, such as phenylethylene group. Plural A (in case where n is 2 or more) may be the same or different. Among A, preferred are ethylene, propylene and butylene groups, and combination of ethylene and propylene groups, particularly ethylene group. Said n is an integer of 0-5, preferably 0-1.

Illustrative of amines of the formula (2) are:

[I] Secondary amines: aliphatic amines, for instance, alkyl amines (such as methyl octyl amine, dodecyl octadecyl amine, dioctadecyl amine, di-hardened tallow alkyl amine and didocosyl amine), and alkenylamines (such as octadecyl allyl amine, methyl oleyl amine and dioleyl amine); cycloaliphatic amines, such as octadecyl cyclohexyl amine; and aromatic amines, such as dibenzyl amine, diphenyl amine, phenyldodecyl methyl amine, diphenyldodecyl amine, and N-octadecyl aniline;

[II] Tertiary amines: aliphatic amines, for instance, alkyl amines (such as dimethyl octyl amine, dimethyl decyl amine, dimethyl dodecyl amine, dimethyl coconut amine, dimethyl myristyl amine, dimethyl palmityl amine, dimethyl octadodecyl amine, methyl didodecyl amine, methyl dioctadodecyl amine, trioctyl amine and tridodecyl amine), and alkenylamines (such as dioctadecyl allyl amine, octadecyl diallyl amine, dimethyl oleyl amine, methyl dioleyl amine and dimethyl rinoleyl amine); cycloaliphatic amines, such as methyl octadecyl cyclohexyl amine; and aromatic amines, such as tribenzylamine, triphenylamine, dimethyl benzyl amine, dimethyl phenyldodecyl amine and N,N-dimethyl-p-dodecyl aniline; and

[III] Polyamines: apiphatic polyamines, for example, alkyl-substituted alkylene($C_2$–$C_4$) diamines or dialkylene ($C_2$–$C_4$) triamines, such as octadecyl ethylene diamines, tridodecyl propylene diamines and octadecyl tetramethyl diethylene triamines; as well as mixtures of two or more of these amines. Among these, preferred are aliphatic monoamines, especially those containing at least one aliphatic hydrocarbon radical of 10-30 carbon atoms.

In stead of or in combination with these amines of the formula (2), there may be used other secondary and/or tertiary amines, for instance, cycloaliphatic polyamines, such as dodecyl cyclohexylene diamine and methyl octadecyl isophorone diamine); aromatic polyamines, such as tetradodecyl phenylene diamine, dioctadecyl tolylene diamines, octadecyl xylylene diamines and dioctadecyl diphenylmethane diamine; heterocyclic amines, such as N-amino dodecylpiperazine and N-octadecyl morpholine; alkanol amines, such as dodecyl ethanol amine; and mixtures of two or more of them.

[Component E]

Said amine (D) may be used together with one or more of organic binders. As the organic binder, there can be used one or more thermoplastic resins (E), such as those obtainable by addition polymerization (polymerization of unsaturated compounds), by polycondensation and by ring-opening polymerization.

Suitable examples of resins of addition polymerization type include acrylic resins [polymers and copolymers of esters of (meth)acrylic acids, such as polymethyl (meth)acrylates, polyethyl (meth)acrylates, polybutyl (meth)acrylates, polycyclohexyl (meth)acrylates, butyl (meth)acrylate-methyl (meth) acrylate copolymers, butyl (meth)acrylate-dodecyl (meth) acrylate copolymers, butyl (meth)acrylate-acrylonitrile copolymers, methyl (meth)acrylate-acrylamide copolymers, ethyl (meth)acrylate-2-chloroethyl vinyl ether copolymers, methyl (meth)-acrylate-(meth)acrylic acid copolymers, methyl (meth)-acrylate-hydroxyethyl (meth)acrylate copolymers, and butyl (meth)acrylate-N,N-dimethylaminoethyl (meth)acrylate copolymers]; olefinic resins [(co)polymers of hydrocarbon monomers or derivatives thereof], such as polyethylenes, polypropylenes, polybutenes, polyisobutylenes, polystyrenes, poly-alpha-methylstyrenes, chlorinated polyethylenes, ethylene copolymers, such as ethylene-vinyl acetate copolymers, ethylene-acrylic copolymers [ethylene-methyl (meth)acrylate copolymers, ethylene-butyl (meth)acrylate copolymers, ethylene-(meth)acrylic acid copolymers and the like], styrene copolymers, such as styrene-acrylic copolymers [styrene-methyl (meth)acrylate copolymers, styrene-butyl (meth)acrylate copolymers, styrene-(meth)acrylic acid copolymers and the like]; vinyl esteric or alcoholic resins, such as polyvinyl acetates, polyvinylacetals (polyvinylformals, polyvinylacetoacetals, polyvinylpropionals, polyvinylbutyrals, polyvinylhexylals and the like; halo-containing resins, such as polyvinyl chlorides, vinyl chloride-methyl (meth)acrylate copolymers, vinyl chloride-acrylonitrile copolymers, vinyl chloride-ethylene copolymers, polyvinylidene chlorides, poly-4-fluoro-ethylene, poly-3-fluoroethylene, polyvinylidene fluorides, and the like; nitrogen-containing resins, such as poly(-meth)acrylonitriles, polymethyl cyanoacrylares, polyvinylidene cyanides; and so on. Suitable polycondensation type resins include, for example, polyesters, such as polyethylene terephthalates, polytetramethylene terephthalates and polyethylene sebacates; polyamides, such as Nylon 66; polyimides; polysulfones; poly-parephenylenes; and the like. Examples of suitable ring-opening polymerization type resins are inclusive of polyethers, such as polyethylene oxides, polypropylene oxides and polytetramethylene glycols. Semi-synthetic polymers, such as nitrocellulose, cellulose acetate and ethyl cellulose, may also be used. Two or more of these thermoplastic resins can be used in combination. Among these resins, preferred are polyisobutylenes, polymethacrylate esters, polystyrenes, polyethylene oxides, polypropylene oxides and poly-alphamethylstyrenes. More preferred are polymethacrylate esters, polystyrenes and polyethylene oxides.

[Additional components]

Furthermore, the binder may contain optionally one or more additional components, such as plasticizers, lubricants, surfactants, various coupling agents (such as silane coupling agents), and so on.

Suitable examples of plasticizers include ester plasticizers, including carboxylates, for example, esters of aromatic mono- or poly- carboxylic acids, such as phthalates (dimethyl, diethyl, dibutyl, diheptyl, di-n-octyl, di-2-ethylhexyl, ditsononyl, diisodecyl, dilauryl, dicyclohexyl and butylbenzyl phthalates, and the like), trimellitates (tris-$C_4$–$C_{11}$alkyl trimellitates, such as tris-2-ethylhexyl trimellitate, and the like), benzoates (polyoxyalkylene benzoates, such as polyoxyethylene benzoates, and the like); esters of aliphatic monobasic acids, such as butyl oleate and Glycerin monooleate; esters of aliphatic dibasic acids, such as adipates (dibutyl, dihexyl, di-n-octyl, di-2-ethylhexyl, didecyl, diisodecyl and other dialkyl adipates, dibutyldiglycol adipate and the like), azelates (such as di-2-ethylbutyl and di-2-ethylhexyl azelates), sebacates (such as dibutyl, di-n-octyl and di-2-ethylhexyl sebacates), maleares (such as dibutyl and di-2-ethylhexyl maleares), fumarates (such as dibutyl fumarate), and so on; esters of dihydric alcohols, such as diethylene Glycol dibenzoate and triethylene glycol di-2-ethyl-butyrate; esters of hydroxy acids, such as ricinoleates (methyl acetyl-ricinoleate, butyl acetyl-ricinoleate and the like), glycolares (such as butyl phthaloyl butyl glycolate), citrates (triethyl acetyl-citrate, tributyl acetyl-citrate and the like); and polyesters, such as polypropylene adipates; and phosphates, such as triethyl, tributyl, triocryl, trichloroethyl, tricresyl, tributoxyethyl, trisdichloropropyl, tris-beta-chloropropyl, triphenyl, octyl diphenyl and trisisopropylphenyl phosphates; epoxy plasticizers, such as epoxidized fatty esters; and other plasticizers, such as stearic acid plasticizers and chlorinated paraffin plasticizers; as well as mixtures of two or more of these plasticizers. Among these, preferred are phthalates, esters of aliphatic dibasic acids, and polyoxyalkylene benzoates. More preferred are phthalates, particularly dibutyl, dioctyl and butylbenzyl phthalates.

Illustrative examples of lubricants are aliphatic hydrocarbons, liquid paraffins, microcrystalline waxes, natural paraffins, synthetic paraffins, polyolefin waxes, and derivatives of them (such as partially oxidized ones, chlorinated ones and fluorinated ones); higher fatty alcohols, such as lauric, stearyl and oleyl alcohols, and mixed fatty alcohols; higher fatty acids, such as lauric, stearic and oleic acids, and mixed fatty acids (those obtainable from tallow, fish oil, coconut oil, soybean oil, colza oil, rice bran oil and the like), fatty amides (oleylamide, stearylamide, methylene-bis-stearamide, ethylene-bis-stearamide and the like), soaps and metallic soaps (stearates of barium, calcium, zinc, aluminum, magnesium and the like), fatty esters [higher fatty acid esters of monohydric alcohols (such as butyl oleate), higher fatty acid (partial) esters of polyhydric alcohols (such as glycerin monooleate), montan wax, and the like]; and mixtures of two or more of them. Among these, preferred are aliphatic hydrocarbons, higher fatty acids and fatty esters, especially liquid paraffins, stearic acid and montan wax.

Suitable surfactants include those written in U.S. Pat. No. 4,331,447, for example, anionic surfactants, such as dodecylbenzene sulfonates and polyoxyethylene(4) nonylphenylether sulfates; nonionic surfactants, such as polyoxyethylene(4) stearyl amine, mono- and/or diethanol amide of stearic acids; cationic surfactants, such as lauryltrimethylammonium chloride; ampholytic surfactants, such as stearyldimethylcarboxymethylbetaine; and mixtures of two or more of them. Surfactants can improve wettability of the binder towards the particulate material.

[Particulate Material]

Metallic powders employed with the binder in the preparation of the moldable compositions of this invention may be prepared from any metal which is stable in the atmosphere and is reducible to powdered form. Examples of materials of metal character that are applicable for use are metals, for example, iron (such as carbonyl iron, atomized iron and reduced iron), nickel (such as carbonyl nickel), cobalt, aluminum, copper, titanium, molybdenum, zirconum, chromium, lead, manganese, wolfram, zinc, tin, beryllium, germanium, magnesium, silicon and boron; and alloys containing two or more thereof, for example, stainless steel, iron-nickel alloy, high speed steel, super alloy, magnetic materials, brass, bronze, monel metal, iron-silicon alloy, iron-boron alloy and the like. Among these, preferred are iron, and iron alloys, such as stainless steel, iron-nickel alloy and high speed steel.

Ceramic powders, which may be utilized in the invention in conjunction with (or in stead of) metallic powders, include for example, oxides, such as alumina, silica, zirconia, beryllia, magnesia and titania; silicates such as mullite and cordulite; titanates, such as barium titanate; carbides (particularly water non-reactive carbides), such as carbides of silicon, boron, aluminium, wolfram, titanium, zirconium, hafnium, chromium and vanadium, and carbon; nitrides, such as those of silicon, aluminum, boron and titanium; silicides, such as molybdenum disilicide; sulfides, such as cadmium sulfide and zinc sulfide; and so on, as well as mixtures of two or more of them. Among these, preferred are alumina, zirconia, mullite, silicon carbide and silicon nitride.

There can be used mixtures of metallic and ceramic powders, for example, wolfram carbide-cobalt, and alumina-aluminium. Such mixtures include blends of metallic powder and ceramic powder, and alloys of metallic powder and ceramic powder.

These particulate materials (metallic powders and/or ceramic powders) may contain usual small percentage of impurities or/and additives. For instance, sintering aids, molding agents and other additives for improving physical properties may be added by blending merely or by surface-coating onto the materials.

The average particle size of these particulate materials can vary widely, for instance, ranging from 0.01 to 50 microns, preferably 0.1 to 20 microns (micron m). The average particle size may vary somewhat larger range, such as from 0.01 to 100 microns, in some case, particularly in case where said amine (D) is used. These particulate materials may be used alone or as a mixture of two or more of such materials of different kinds or different particle sizes. Particulates of less than 0.01 micron diameter are bulky and difficult to handle and result in poor moldability. Particulates of larger than 50 microns are of poor sinterability.

[Composition]

In moldable composition of the present invention, the component A, having a heat deformation temperature (hereinafter referred to as HDT) of 130° C. or higher, serves for reducing deformation during debinding, as well as imparting flowability to the composition; while components having a heat deformation temperature of less than 130° C. are insufficient for reducing deformation during debinding. The component A may be used in such an amount of generally 20–100%, preferably 30–60%, based on the weight of the binder. Using less than 20% results in molded bodies of poor strength and difficulty in handling.

The component B, having a melting point of usually 30° C.–100° C., serves for heightening the deformation reducing effects and for accelerating debinding, along with improving flowability to facilitate injection molding. Compounds, having a melting point of more than 100° C., have insufficient deformation reducing effects; and compounds, having a melting point of less than 30, will result in molded products of lower strength. The component B can be used in such an amount of generally 0–80%, preferably 40–70%, based on the weight of the binder. Using more than 80% results in molded products of insufficient strength.

The component C may be used in such an amount of generally 0–60%, preferably 0–40%, more preferably 0.1–30%, based on the weight of the binder. Molded bodies obtained by using more than 60% of the component C are likely to be deformed.

In the moldable composition of the present invention, the particulate material may be used in such an amount of generally 40–70%, preferably 50–80%, based on the volume of the composition. When the amount of the particulates is more than 70%, it become difficult to kneading homogeneously them with the binder and to injection mold. Using the particulates in smaller than 40% causes larger deformation of molded bodies during debinding.

In the moldable compositions, comprising a particulate material, mixed with said amine (D), the amounts of (D) and the particulate material can vary widely, and molding can be attained with use of lower amount of the organic components. For instance, (D) and the particulate material may be used in such amounts of generally 0.1–50% preferably 0.1–30%, and usually 50–99.5% preferably 70–99.9%, respectively, based on the weight of the composition. Use of less than 0.1% of (D) or more than 99.9% of the particulate material results in poor moldability; and use of more than 50% of (D) or less than 50% of the particulate material causes reduction of strength of debinded bodies.

The amount of the organic binder (E) may be usually 0–49.9% preferably 0.5–29.9%. Use of more than 50% of the binder results in debinded bodies of poor strength.

Additional components (plasticizers, lubricants, surfactants and so on) may be used in such an amount as usually used (for instance 0–40%, preferably 0–30%, based on the weight of the composition.

[Process]

The composition of the invention can be produced by mixing or/and kneading the components.

Mixing can be carried out by using conventional mixing means, such as a twin-cylinder mixer, a Henschel mixer, a ball mill or the like, followed by drying if necessary. When using a twin-cylinder mixer, a Henschel mixer or the like, mixing temperature is usually 0°–100° C. preferably 0°–50° C., and mixing time is generally 10 minutes–6 hours preferably 30 minutes–2 hours. Mixing with a ball mill or the like may be carried out under dry or wet conditions, at a temperature of usually 0°–50° C., for generally 6–72 hours preferably 6–36 hours. Drying may be done within an air or an atmosphere of an inert gas, at normal pressure or under a reduced pressure, under heating and/or with hot-air. It is preferred drying under non-oxidizing atmosphere (an atmosphere of inert gas, such as nitrogen, argon or the like), or under reduced pressure.

Kneading may be carried out under melting by using any of known kneading machines, such as Banbury mixers, Lab Plast Mill®'s (Lab Plast Mill is a registered tradename of TOYO SEIKI SEISAKUSHO, Ltd.), kneaders, pressure kneaders, roll mills, extruders (screw extruders) and the like. Among these, preferred are pressure kneaders and extruders. Kneading temperature is generally 50°–300° C. or higher (such as up to 350° C.), preferably 100°–250° C., more preferably 150°–200° C., and the temperature may be controlled at a constant, increasing or decreasing temperature. Kneading may be carried out at a temperature lower than the heat deformation temperature of a resin powder which is apart of component A. Kneading may be carried out within an air or an atmosphere of an inert gas, preferably under non-oxidizing atmosphere (an atmosphere of inert gas, such as nitrogen, argon or the like) or under reduced pressure (in vacuo). Kneading time is usually 10 minutes–3 hours or longer (such as up to 10 hours), preferably 20 minutes–2 hours, more preferably 30 minutes–an hour.

The components may be mixed or kneaded in any order as far as a homogeneous mixture is obtained. Each component or a mixture may be dried before kneading, if neccesary. Suitable kneading methods include, for example, those by charging and kneading all the components at once; those by kneading a part of the components at first, followed by adding thereto the rest and kneading [for instance, those by kneading the organic components at first and then adding thereto the particulate material(s); those by kneading the particulate material(s) with a part of the organic components {such as said amine (D) or the binder} at first and then adding thereto the rest of the organic components {such as the binder or said amine (D)} and those by adding the organic or binder components afterwards.] The kneaded compositions may be crushed (or granulated) after cooling, follwed by pelletizing if necessary.

The moldable compositions thus obtained can be formed into various molded bodies (such as sheet, articles of complicated shape, and so on), by known molding techniques, for example, injection molding, extrusion molding, press molding (such as cold press, compression molding and transfer molding), and the like. Among these, preferred are injection molding. Injection molding may be carried out by means of usual injection molding machines, such as plunger injection machines and screw injection machines.

Molding conditions may vary according to the shape of molds and moldable compositions. In general, molding pressure is usually 10–20,000 Kg/cm$^2$, preferably 20–10,000 Kg/cm$^2$, more preferably 100–3000 Kg/cm$^2$, most preferably 200–2000 Kg/cm$^2$, and molding temperature is generally 20°–300° C. or higher (such as up to 350° C.), preferably 50°–250° C., more preferably 150°–200° C. Molding may be carried out under reduced pressure (in vacuo) or under non-oxidizing atmosphere (an atmosphere of inert gas, such as nitrogen, argon or the like).

The molded articles after demolding are debinded or baked. Debinding or baking process is preferably carried out in an atmosphere of oxidizing gas (such as air), reducing gas (such as hydrogen or carbon mono-oxide) or inert gas (such as nitrogen or argon), under reduced pressure, under normal pressure or under pressure, heating at a rate of usually 1°–500° C./hr, preferably 1°–200° C./hr, more preferably 1°–60° C./hr, most preferably 10°–40° C./hr to a final temperature of usually 150°–500° C. or higher, preferably 160°–400° C., more preferably 160°–350° C., followed by maintaining the above temperature generally for 0–10 hours, preferably for 1–5 hours. It is preferred to debind under an atmosphere of oxidizing gas, such as air.

Molded bodies comprising the composition of this invention have no or little tendency of deformation and may be debinded as such, without necessity of burying in particulated material or supporting with a setter. Debinding can be accomplished merely by placing the bodies on a shelf board within a debinding furnace. By using an atmosphere-flowable shelf board, the body surface including the underside can be exposed to the atmospheric gas, whereby debinding time can be shortened. Examples of such shelf boards include wire sheets, such as stainless steel wire cloth, and support grid or ceramic formed in the shape of lattice.

The product from the debinding or baking step is then sintered to obtain the final product. Sintering can be carried out in an atmosphere of oxidizing gas, reducing gas or inert gas, under reduced pressure, under normal pressure or under pressure, heating to a final temperature of usually 600°–2500° C., preferably 600°–2200° C., more preferably 800°–2000° C. Heating rate is usually 50°–1000° C./hr, preferably 50°–300° C./hr. The final temperature is maintained generally for 10 minutes–10 hours, preferably for 30 minutes–3 hours. In case where the sintering operation is carried out in a vacuum, the degree of vacuum is generally $10^{-2}$ Torr or less, preferably $10^{-3}$ Torr or less.

In this invention, there is no necessity of brushing off of the particulate materials used in conventional methods for burying molded bodies to prevent deformation; and therefore the steps from debinding to sintering according to the invention can be carried out continuously within a same furnace.

[Effects]

Moldable compositions of the present invention containing as the binder the resin component (A) having HDT of at least 130° C., particularly those containing (A) in conjunction with the component (B) having a melting point of 30° C.–100° C., can provide debinded articles of excellent appeareance free from deformation, even at a longer distance (L) between supporting rods (that is even a larger molded articles), or even when is used such a particulate material as stainless steel which is liable to cause deformation during debinding; while moldable compositions comprising low HDT components such as PP and wax, without said component (A), were apt to be deformed by gravity, particularly in case of stainless powder.

By using as the component (A) in this invention such a resin as polyacetal which has HDT of at least 150° C. and is easily decomposed and using as the component (B) such a low melting component as polyethyleneglycol which is also easily decomposed, debinding can be attained within a short period of time, at lower temperature, in addition to improvement of deformation inhibiting effects.

According to the present invention, there can be obtained the following effects:

1) Deformation by gravity can be inhibited, and therefore burying molded bodies in ceramic or metallic powder during debinding and use of holding fixture for shape retention become unneeded. As the results, productivity and precision of products can be improved remarkably.
2) There can be produced dibinded bodies without deformation, even molded products of complicated configuration or of oversize, or even products of particulate materials as stainless steel liable to cause deformation during debinding,
3) Needlessness for burying in particulate material and removing therefrom makes it possible to carry out series production from debinding to sintering to improve productivity.
4) There can be attained increase of heating rate and accordingly shortening of debinding time.

Moldable compositions, comprising a particulate material and said amine (D), as another aspect of the present invention, can provide the following effects:

1) Time required for debinding molded bodies can be reduced remarkably.
2) Molding can be attained with use of lower amount of organic components, and therefore gas evolution amount can be reduced.
3) Sintered bodies substantially free from residue of impurities, such as carbon, can be obtained.
4) Sintered bodies of high denseness, substantially free from residue of impurities, such as carbon, can be obtained.
5) Molded articles thus obtained have high relative density ang improved strength.

By carrying out kneading and/or molding under nonoxidizing atmosphere or in vacuo, thermal decomposition of the binder during kneading or molding can be inhibited, and there can be attained sintered articles of stable or constant qualities even when the compounds are used recycling.

Having generally described the invention, a more complete understanding can be obtained by reference to certain specific examples, which are included for purposes of illustration only and not intended to be limiting unless otherwise specified.

In the following examples, parts, ratio and % mean parts by weight, weight ratio and % by weight, respectively, unless otherwise specified.

Abbreviated words used in the following examples are as follows:

PC: polycarbonate; CO-POM: polyacetal copolymer; POM: polyacetal homopolymer; PSF: polysulfone; PMMA: polymethylmethacrylate; PP: polypropyrene;

PBA: polybutyl acrylate; PBM: polybutyl methacrylate;

PEG-4000: polyethylene glycol (MW 4000);

PEO: polyethylene oxide; X-PS: Crosslinked polystyrene;

X-SA: Crosslinked sutyrene/acrylate copolymer;

PW: paraffin wax; DBP: dibutyl phthalate;

DOA: di-octadecyl amine; DOA: di-octadecyl amine;

DMOA: dimethyl octadecyl amine; ODA: octadecyl amine;

E/VAc: ethylene-vinyl acetate copolymer;

FEN-8 powder: a mixed powder comprising 92% of iron powder (average diameter of 4 microns) and 8% of nickel powder (average diameter of 10 microns);

SUS 304 powder: stainless steel 304 powder (average diameter of 10 microns)

HDT: heat distortion temperature; RD: relative density;

BSG: bulk specific gravity and MC: micro-cracking.

EXAMPLES 1-4

Figure 2:
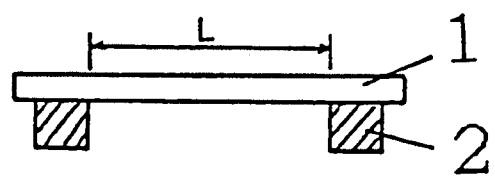
FIG. 2 is a cross sectional view illustrating the method for measuring deformation of a specimen.
Figure 3:
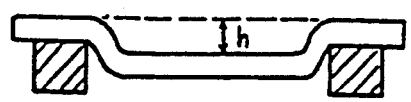
FIG. 3 is a cross sectional view illustrating the deformed amount (h).

Moldable compositions were prepared by combinations of 56 volume % of iron powder (average diameter of 4 microns) or SUS 304 powder with each of 4 resins (PC, CO-POM, POM and PSF), having HDT of at least 130° C., as written in Table 1. Each composition was kneaded with a pressure kneader, for about 45 minutes at a temperature between 180° C. and 380° C. depending on the resin used, followed by heat pressing at 200°-380° C. to form specimens (100 mm × 10 mm × 4 mm) as shown in FIG. 1. Each specimen was put on two supporting rods placed at a certain distance L (10 mm, 20 mm or 30 mm), as shown in FIG. 2, followed by heating it within a circulating furnace at a rate of 10° C./hr to a temperature between 300° C. and 500° C. depending on the resin to decompose and remove at least 90% of the resin. Degree of deformation of the debinded body was evaluated by the deformed height (h) as shown in FIG. 3.

Comparative Examples 1 and 2

Example 1 was repeated except using each of 2 resins (PMMA and PP), having HDT of less than 130° C., as written in Table 1.

The results were as shown in Table 1.

TABLE 1

| | | Binder | | Powder L, mm | Deformed height (h), mm | | | | | |
|---|---|---|---|---|---|---|---|---|---|---|
| | | | HDT. | | SUS 304 | | | Iron | | |
| Example No. | | Resin | C. | | 10 | 20 | 30 | 10 | 20 | 30 |
| Example | 1 | PC | 138 | | 0 | 1 | 2 | 0 | 0.5 | 1 |
| | 2 | CO-POM | 158 | | 0 | 0 | 0 | 0 | 0 | 0 |
| | 3 | POM | 170 | | 0 | 0 | 0 | 0 | 0 | 0 |
| | 4 | PSF | 181 | | 0 | 0 | 0 | 0 | 0 | 0 |
| Comparative | 1 | PMMA | 79 | | 5 | 5 | 5 | 3 | 5 | 5 |
| Example | 2 | PP | 110 | | 5 | 5 | 5 | 2 | 4 | 5 |

The specimen of Example 1 showed some deformation at longer L, but the specimens of Examples 2, 3 and 4 using resins of at least 150° C. of HDT showed no deformation. On the other hand, the specimens of Comparative Examples 1 and 2 resulted in considerable deformation.

EXAMPLES 5-7

(1) Moldable compositions were prepared by using as the metallic powder either FEN-8 powder or SUS 304 powder and using as the binder the same POM or CO-POM as in Examples 2 and 3 in admixture with PEG-4000 [melting point: 56° C.], in accordance with the formulation shown in Table 2. Each composition was kneaded with a pressure kneader, for about 45 minutes at a temperature between 150° C. and 180° C., followed by crushing under cooling to obtain an injection moldable compound.

(2) Then, each compound was molded into the same specimen as in FIG. 1, using a injection molding machine under conditions of the heating cylinder temperature of 150°-170° C., the mold temperature of 50° C. and the injection pressure of 1500 Kg/cm².

(3) Each specimen was set in the same manner as in Example 1 and debinded by heating within a circulating furnace at a rate of 20° C./hr to a temperature of 350 C. and maintaining the temperature for 2 hrs to attain a debinding ratio of about 98%, and degree of deformation of the debinded body was evaluated as in Example 1. The debinded specimens showed no deformation, and nothing wrong was observed, such as cracking or blistering.

(4) The above debinding process was repeated except that the heating rate was raised to 30° C./hr. Similarly, nothing wrong was observed.

Comparative Examples 3 and 4

(1) Injection moldable compositions were prepared by repeating Example 5(1) except using the same PP as in Comparative Example 2 in admixture with PW [melting point: 58° C.], in accordance with the formulation shown in Table 2.

(2) Then, Example 5(2) was repeated under injection molding conditions of the heating cylinder temperature of 150° C., the mold temperature of 50° C. and the injection pressure of 1500 Kg/cm², and resulted in a debinding ratio of about 85% and degree of deformation as written in Table 2.

TABLE 2

| Example No. | | Example | | | Comparative Example | |
|---|---|---|---|---|---|---|
| | | 5 | 6 | 7 | 3 | 4 |
| Composition, % | FEN-8 | 88.6 | 88.6 | — | 91.3 | — |
| | SUS304 | — | — | 88.6 | — | 91.8 |
| | POM | 4.5 | — | — | — | — |
| | CO-POM | — | 4.5 | 4.5 | — | — |
| | PP | — | — | — | 4.1 | 4.1 |
| | PEG-4000 | 6.7 | 6.7 | 6.7 | — | — |
| | PW | — | — | — | 4.1 | 4.1 |
| Deformed height (h), mm | L, mm | | | | | |
| | 10 | 0 | 0 | 0 | 1 | 1 |
| | 20 | 0 | 0 | 0 | 3 | 3 |
| | 30 | 0 | 0 | 0 | 5 | 5 |

EXAMPLE 8

Example 7 was repeated except that the molded specimen was debinded by heating within a circulating furnace set on stainless steel wire cloth so as to exposing the surface including the underside to circulating hot air to shorten the debinding time. There was obtained a debinded body of good appearance with a debinding ratio of about 98%.

EXAMPLE 9

(1) The debinded body obtained in Example 7 was sintered in a vacuum of $10^{-3}$ Torr or less, at 1250 C. for 2 hrs to obtain a sintered body having RD of 95%.

(2) Example 7 was repeated except that a stainless steel powder having average diameter of 4.7 micron was used as the metallic powder. The resulting debinded body was sintered in the same manner as in the above (1) to obtain a sintered body having RD of 98%.

EXAMPLES 10–13

Examples 1–4 were repeated except using, instead of metallic powder, mixtures of metallic powder and ceramic powder as follows. There were obtained debinded bodies free from deformation.

metallic powder: cobalt
ceramic powder: wolfram carbide

EXAMPLES 14–17

Moldable compositions were prepared by combinations of alumina powder (average diameter of at most 1 micron) or SUS 304 powder, with PBM, PEO (MW: about 20,000), DBP, and DOA or DMOA, according to the formulations (parts) as written in Table 3.

Using a Lab Plast Mill®, the components were mixed at 130° C. and at 30 rpm rotor revolution and then kneaded at 130° C. and at 50 rpm rotor revolution, followed by crushing the kneaded product to obtain moldable compositions.

Comparative Examples 5–12

Moldable compositions were prepared by repeating Examples 14–17, except using PW or ODA.

TABLE 3

| Example No. | Example | | | | Comparative Example | | | | | | | |
|---|---|---|---|---|---|---|---|---|---|---|---|---|
| | 14 | 15 | 16 | 17 | 5 | 6 | 7 | 8 | 9 | 10 | 11 | 12 |
| Alumina | 100 | 100 | — | — | 100 | 100 | 100 | 100 | — | — | — | — |
| SUS 304 | — | — | 100 | 100 | — | — | — | — | 100 | 100 | 100 | 100 |
| PBM | 6.9 | 6.9 | 3.3 | 3.0 | 6.9 | 11.2 | 6.9 | 11.2 | 3.3 | 5.6 | 3.3 | 5.6 |
| PEO | 1.1 | 1.1 | 0.6 | 1.1 | 1.1 | 1.8 | 1.1 | 1.8 | 0.6 | 0.9 | 0.6 | 0.9 |
| DBP | 0.9 | 0.9 | 0.4 | 0.8 | 0.9 | 1.5 | 0.9 | 1.5 | 0.4 | 0.6 | 0.4 | 0.6 |
| DOA | 2.2 | — | — | — | — | — | — | — | — | — | — | — |
| DMOA | — | 2.2 | 2.2 | 2.2 | — | — | — | — | — | — | — | — |
| PW | — | — | — | — | 2.2 | 3.6 | — | — | 1.5 | 2.3 | — | — |
| ODA | — | — | — | — | — | — | 2.2 | 3.6 | — | — | 1.5 | 2.3 |

Each composition of Examples 14–17 and Comparative Examples 5–12 was injection molded into the same specimen as in FIG. 1, under conditions of the injection pressure of 1500 Kg/cm² and the molding temperature of 150° C., followed by debinding for 10 hours (a) or 32 hours (b), and then sintering under conditions:

1) at 1600° C. for 2 hours within air in case of alumina, or 2) at 1250° C. for 2 hours under reduced pressure in case of stainless.

The results of moldability, debindability, and BSG and RD (%) of sintered bodies were as shown in Table 4.

TABLE 4

| Composition | | Example | | | | Comparative Example | | | | | | | |
|---|---|---|---|---|---|---|---|---|---|---|---|---|---|
| | | 14 | 15 | 16 | 17 | 5 | 6 | 7 | 8 | 9 | 10 | 11 | 12 |
| Mold.*1 | | ○ | ○ | ○ | ○ | X | ○ | X | ○ | X | ○ | X | ○ |
| Debind.*2 | (a) | ○ | ○ | ○ | ○ | — | X | — | X | — | X | — | X |
| | (b) | ○ | ○ | ○ | ○ | — | ○ | — | ○ | — | ○ | — | ○ |
| Sintered body | BSG | 3.9 | 3.9 | 7.4 | 7.4 | — | 3.9 | — | 3.9 | — | 7.3 | — | 7.3 |
| | RD | 99 | 99 | 93 | 93 | — | 99 | — | 99 | — | 92 | — | 92 |

*1)Moldability:
○ = a molded body was obtained.
X = a molded body was not obtained.
*2)Debindability:
○ = neither blistered nor cracked.
X = blister or crack was occurred.

EXAMPLES 18–20 and Comparative Examples 13 and 14

Moldable compositions were prepared, according to the formulations (parts) as written in Table 5, by repeating the procedure of Examples 14–17 except that kneading was carried out at 8° C.

TABLE 5

| Example No. | Example | | | Comparative Example | |
|---|---|---|---|---|---|
| | 18 | 19 | 20 | 13 | 14 |
| Alumina | 100 | — | — | 100 | — |
| SUS 304 | — | 100 | 100 | — | 100 |
| X-PS (1*) | 5 | — | — | — | — |
| X-PSI (6*) | — | 5 | — | — | — |
| X-SA (10*) | — | — | 5 | — | — |
| PBA | 10 | — | — | — | — |
| PBM | — | 10 | 10 | 10 | 10 |
| PW | 5 | 5 | 5 | 5 | 5 |

*The Number in the parenthesis represents particle size (micron) of the resin powder.

Each composition of Examples 18–20 and Comparative Examples 13 and 14 was molded using a screw injection molding machine under conditions of the injection pressure of 1500 Kg/cm² and the molding temperature of 150° C. to form a injection molded article, followed by debinding under conditions of the maximum temperature of 400° C. and debinding period of 32 hours, and then sintering under conditions of at 1600° C. for 2 hours within air in case of alumina, or at 1250° C. for 2 hours under reduced pressure in case of stainless.

Occurrences of thermal deformation and microcracking (hereinafter referred to as MC) and RD of the resulting sintered articles were examined. The results were as shown in Table 6.

TABLE 6

| Composition | Example | | | Comparative Ex. | |
|---|---|---|---|---|---|
| | 18 | 19 | 20 | 13 | 14 |
| Thermal deformation* | NO | NO | NO | Ob | Ob |
| MC* | NO | NO | NO | NO | NO |
| RD | 99 | 95 | 95 | 99 | 95 |

(Notes)
*NO: Not observed; Ob: Observed.

EXAMPLES 23–24 and Comparative Examples 15 and 16

Moldable compositions were prepared, according to the formulations as written in Table 7. Using a Lab Plast Mill ®, PBM and PEO were charged and melted at 130° C. and at 30 rpm rotor revolution. Then, alumina powder or stainless powder and montan wax were added gradually, followed by kneading at 130° C. and at 50 rpm for 30 minute and then crushing.

TABLE 7

| Example No. | Example | | | | Comparative | |
|---|---|---|---|---|---|---|
| | 21 | 22 | 23 | 24 | 15 | 16 |
| Alumina | 100 | — | 100 | — | 100 | — |
| SUS 304 | — | 100 | — | 100 | — | 100 |
| PEO (MW 20,000) | — | 10.0 | — | — | — | — |
| PEO (MW 100,000) | 20.0 | — | — | — | — | — |
| PEO (MW 200,000) | — | — | 10.0 | 7.5 | — | — |
| PBM | — | — | 3.2 | 1.6 | 6.5 | 3.2 |
| E/VAc | — | — | — | — | 5.6 | 2.8 |
| DBP | — | — | — | — | 2.5 | 1.3 |
| Montan wax | — | — | 1.6 | 1.0 | 2.9 | 1.3 |

Each composition of Examples 21–24 and Comparative Examples 15 and 16 was molded using a screw injection molding machine under conditions of the injection pressure of 1500 Kg/cm² and the molding temperature of 150° C. to form a injection molded article, followed by debinding under conditions of the following (i) or (ii), and then sintering under conditions of at 1600° C. for 2 hours within air in case of alumina, or at 1250° C. for 2 hours under reduced pressure in case of stainless.

| | The maximum temperature | Debinding period |
|---|---|---|
| Conditions (i) | 300° C. | 32 hours |
| Conditions (ii) | 400° C. | 52 hours |

Occurrence of micro-cracking and BSG and RD of the resulting sintered articles were examined. The results were as shown in Table 8.

TABLE 8

| Composition | Example | | | | Comparative Example | | | |
|---|---|---|---|---|---|---|---|---|
| | 20 | 21 | 22 | 23 | 15 | 15 | 16 | 16 |
| Debinding Conditions | (i) | (i) | (i) | (i) | (i) | (ii) | (i) | (ii) |
| MC* | NO | NO | NO | NO | Ob | NO | Ob | NO |
| BSG | 3.9 | 7.4 | 3.9 | 7.4 | 3.3 | 3.9 | 6.2 | 7.1 |
| RD | 99 | 93 | 99 | 93 | 84 | 99 | 79 | 91 |

(Notes)
*NO: Not observed; Ob: Observed.

EXAMPLE 25

A molded specimen, formed in the same manner as in Example 7, was debinded by heating within a circulating furnace at a rate of 60° C./hr to a temperature of 120° C. and then at a rate of 5° C./hr to a temperature of 165° C., followed by maintaining the temperature for 2 hrs to obtain a debinded body having Good appearence and a debinding ratio of about 92%. The resulting debinded body was sintered in the same manner as in Example 9 (1) to obtain a sintered product having RD of 95%.

EXAMPLE 26

Example 7(1) was repeated except that kneading was carried out under an atmosphere of nitrogen to obtained a kneaded mixture.

The kneaded mixture was molded under the same conditions as Example 7(2), except that molding was carried out under an atmosphere of nitrogen, and the mixture was molded recycling 10 times under the same conditions as above. Even after 10 times recycling, there were no substantial reduction of the amount of the binder by thermal decomposition and no change in moldability.

The resulting molded product was debinded under the same conditions as in Example 24 to obtain a debinded body having good appearance and a debinding ratio of about 92%. The resulting debinded body was sintered in the same manner as in the above (1) to obtain a sintered product having RD of 95%. Dimensional accuracy of each part of the sintered product was within tolerance limits of 0.2%.

In case where kneading and molding were carried out without using an atmosphere of nitrogen, the amount of the binder was reduced about 2% by thermal decomposition after 10 times recycling, and the resulting sintered product after 10 times recycling showed maximum 0.5% of dimensional inaccuracy as compared with the first (non-recycled) product.

What is claimed as new and desired to be secured by Letters Patent is:

1. A moldable composition, which consists of:
   (1) 40–70% based on the volume of said composition of a metallic powder or a mixed powder of metallic and ceramic powder having an average diameter of 0.01 to 50 microns, mixed with correspondingly
   (2) 60–30% based on the volume of said composition of an organic binder, said organic binder consisting of:
      (2a) 20–60% based on the weight of said binder of thermoplastic component (A), having a heat deformation temperature of 130° C. or higher, selected from the group consisting of polyacetals, polyphenylene oxides, polysulfones, polycarbonates, polyesters, polyamides and mixtures thereof, and
      (2b) 40–70% based on the weight of said binder of component (B) having a melting point of 30° C.–100° C., selected from the group consisting of polyethylene glycol having a molecular weight of 1,000 to 20,000, fatty acids, salts of fatty acids, fatty amines, fatty alcohols and mixtures thereof; wherein the amount of said metallic powder of said mixed powder and the amount of said organic binder is 100% based on the volume of said composition.

2. The composition of claim 1, wherein component A is a polyacetal.

3. The composition of claim 1, wherein said component B is a polyethylene glycol having a molecular weight of 1000–10,000.

4. The composition of claim 1, wherein said component B has a melting point of 50°–100° C.

5. The composition of claim 1, wherein said powder component A is a metallic powder 6. The composition of claim 1, wherein 10–40 wt. % of thermoplastic component (A) is a powdered resin selected from the group consisting of cross-linked thermoplastic resins, thermoset resins, and mixtures thereof.

7. The composition of claim 6, wherein said powdered resin has an average particle diameter smaller than the average particle diameter of said metallic powder or said mixed powder.

8. A moldable composition, which consists of:
   (1) 40–70% based on the volume of said composition of a metallic powder or a mixed powder of metallic and ceramic powder having an average diameter of 0.01 to 50 microns, mixed with correspondingly
   (2) 60–30% based on the volume of said composition of an organic binder, said organic binder consisting of:
      (2a) 20–60% based on the weight of said binder of thermoplastic component (A), having a heat deformation temperature of 130° or higher, selected from the group consisting of polyacetals, polyphenylene oxides, polysulfones, polycarbonates, polyesters, polyamides and mixtures thereof,
      (2b) 40–70% based on the weight of said binder of component (B) having a melting point of 30° C.–100° C., selected from the group consisting of polyethylene glycol having a molecular weight of 1,000 to 20,000, fatty acids, salts of fatty acids, fatty amines, fatty alcohols and mixtures thereof, and
      (2c) at least one other thermoplastic component (C) having a heat deformation temperature of 130° C. or less in an amount of at most 40% based on the weight of said binder, selected from the group consisting of polyethylene oxides having a molecular weight of 100,000 to about 5,000,000, polyethylenes, polypropylenes, polyacrylates, and polymethacrylates.

9. A process for producing a moldable composition, which comprises the steps of:
   kneading and heating 4–70% based on the volume of said composition of a metallic powder or mixed powder of metallic and ceramic powders, with 60–30% based on the volume of said composition of an organic binder selected from the group consisting of (1) and (2):
   (1) 20–60% based on the weight of said binder of an organic binder consisting of synthetic resin component (A) having a heat deformation temperature of 130° C. or higher, selected from the group consisting of polyacetals, polyphenylene oxides, polysulfones, polycarbonates, polyesters, polyamides and mixtures thereof; and
   40–70% based on the weight of said binder of a component (B) having a melting point of 30° C.–100° C. selected from the group consisting of polyethylene glycol having a molecular weight of 1,000 to 20,000, fatty acids, salts of fatty acids, fatty amines, fatty alcohols and mixtures thereof; or
   (2) an organic binder consisting of 20–60% and 40–70% based on the weight of said binder of said components (A) and (B), respectively, and a thermoplastic component (C) having a heat deformation temperature of 130° C. or less in an amount of at most 40% based on the weight of said binder, selected from the group consisting of polyphenylene oxides having a molecular weight of 100,000 to about 5,000,000, polyethylenes, polypropylenes, polyacrylates, polymethacrylates, and mixtures thereof.

10. The process of claim 4, wherein said kneading is carried out under a non-oxidizing atmosphere or in vacuo.

11. The process of claim 4, wherein said kneading is carried out at a temperature lower than the heat deformation temperature of resin component (A).

* * * * *

UNITED STATES PATENT AND TRADEMARK OFFICE
CERTIFICATE OF CORRECTION

PATENT NO. : 5,432,224
DATED : July 11, 1995
INVENTOR(S) : Jiroh RYUHGOH ET AL It is certified that error appears in the above-identified patent and that said Letters Patent is hereby corrected as shown below:

In the Abstract, line 9, "13°C." should read --130°C.--.

Column 1, line 37, "takes long" should read --takes a long--.

Column 2, line 60, "re" should read --are--.

Column 4, line 20, "Illusutrative" should read --Illustrative--.

Column 4, line 56, "poly(meth)acylates" should read --poly(meth)acrylates--.

Column 5, line 59, "proups" should read --groups--.

Column 6, line 26, "apiphatic" should read --aliphatic--.

Column 9, line 64, "50-80%" should read --50-60%--.

Column 9, line 67, "...it become difficult to kneading homogeneously them with the binder and to injection mold." should read --it becomes difficult to knead them homogeneously with the binder and injection mold.--.

Column 12, line 42, "dibinded" should read --debinded--.

Column 12, line 68, "ang" should read --and--.

Column 14, line 48, "350 C." should read --350° C.--.

UNITED STATES PATENT AND TRADEMARK OFFICE
CERTIFICATE OF CORRECTION

PATENT NO. : 5,432,224
DATED : July 11, 1995
INVENTOR(S) : Jiroh RYUHGOH ET AL It is certified that error appears in the above-identified patent and that said Letters Patent is hereby corrected as shown below:

Column 15, line 38, "appearence" should read --appearance--.

Column 16, line 68, "8° C." should read --80° C.--.

Column 17, line 39, "Examples 23-24" should read --Examples 21-24--.

Column 17, line 47, "30 minute" should read --30 minutes--.

Column 18, line 35, "Good" should read --good--.

Column 18, line 43, "obtained" should read --obtain--.

Column 19, line 36, "powder" should read --powder.--

Column 20, lines 51 and 54, "claim 4" should read --claim 9--.

Signed and Sealed this

Twenty-fourth Day of September, 1996

Attest:

BRUCE LEHMAN

*Attesting Officer*    *Commissioner of Patents and Trademarks*